United States Patent
Rauth-Lederer

(10) Patent No.: US 8,691,317 B2
(45) Date of Patent: Apr. 8, 2014

(54) PROCESS FOR PRODUCING A MIXTURE AND ALSO USE OF THE MIXTURE CONTAINING BUCKWHEAT

(75) Inventor: Barbara Rauth-Lederer, Grafelfing (DE)

(73) Assignee: Gerbruder Neeb GmbH & Co. KG, Grafelfing (DE)

(*) Notice: Subject to any disclaimer, the term of this patent is extended or adjusted under 35 U.S.C. 154(b) by 100 days.

(21) Appl. No.: 12/866,972

(22) PCT Filed: Feb. 10, 2009

(86) PCT No.: PCT/DE2009/000180
§ 371 (c)(1),
(2), (4) Date: Aug. 10, 2010

(87) PCT Pub. No.: WO2009/103262
PCT Pub. Date: Aug. 27, 2009

(65) Prior Publication Data
US 2010/0323089 A1    Dec. 23, 2010

(30) Foreign Application Priority Data
Feb. 20, 2008  (DE) .......................... 10 2008 010 198

(51) Int. Cl.
*A23L 1/36*    (2006.01)

(52) U.S. Cl.
USPC ........... 426/629; 426/459; 426/466; 426/638; 426/639; 426/640; 426/650

(58) Field of Classification Search
USPC .......... 426/629, 638, 639, 640, 650, 459, 466
See application file for complete search history.

(56) References Cited

U.S. PATENT DOCUMENTS

| | | | | |
|---|---|---|---|---|
| 5,433,961 | A * | 7/1995 | Lanner et al. | 426/93 |
| 7,078,067 | B2 * | 7/2006 | Latha et al. | 426/106 |
| 2008/0317907 | A1 * | 12/2008 | Thomas et al. | 426/93 |

FOREIGN PATENT DOCUMENTS

| | | |
|---|---|---|
| AT | 163512 | 7/1949 |
| DE | 25 30 297 | 1/1976 |
| JP | 55015784 | 2/1980 |
| JP | 62 146573 | 6/1987 |

OTHER PUBLICATIONS

Alden, I. The Cook's Thesaurus, 1996-2005, http://www.foodsubs.com/GrainBuckwheat.html, pp. 1, 2.*
Meyer, L. Food Chemistry, The Avi Publishing Co., Inc., $3^{rd}$ Edition, Westport, Connecticut, pp. 136-138.1978.*
Groats, http://dictionary.reference.com/browse/Groats, p. 1-2, Apr. 26, 2013.*
Ryan, et al., "Phytosterol, Squalene, Tocopherol Content and Fatty Acid Profile of Selected Seeds, Grains, and Legumes", Plant Foods for Human Nutrition, Kluwer Academic Publishers, Jun. 2007.

* cited by examiner

*Primary Examiner* — Helen F Heggestad
(74) *Attorney, Agent, or Firm* — Antonelli, Terry, Stout & Kraus, LLP.

(57) ABSTRACT

A process for preparing a mixture based on buckwheat is described, comprising preparing shelled buckwheat kernels and heating the buckwheat kernels to obtain preroasted buckwheat kernels; adding edible oil to the preroasted buckwheat kernels while continuing the roasting so that the edible oil is added to the preroasted buckwheat kernels in an amount sufficient that the surface of the buckwheat kernels are completely wetted by the edible oil, and continuing the roasting until the buckwheat kernels develop a golden-yellow coloration due to absorption of oil and the roasting; spraying a liquid solution containing salt, sugar or at least one flavoring to the oil and roasted buckwheat kernels so that the oiled and roasted buckwheat kernels are wetted at the surface with the solution containing the salt, sugar or flavoring; and continuing the roasting to evaporate the liquid to obtain the mixture of roasted buckwheat kernels containing salt, sugar or at least one flavoring.

19 Claims, No Drawings

PROCESS FOR PRODUCING A MIXTURE AND ALSO USE OF THE MIXTURE CONTAINING BUCKWHEAT

TECHNICAL FIELD

The invention relates to a process for producing a mixture based on buckwheat and also the use of the mixture.

BACKGROUND OF THE INVENTION

Field of the Invention

Buckwheat is referred to in the literature as a pseudograin, because botanically buckwheat belongs to the Polygonaceae plants (knotweed family), although it is edible in a manner comparable to that of cereal grains. The name buckwheat originates from its wheat-like ingredients and its external appearance, which resembles that of beechnuts. From the standpoint of nutritional physiology, buckwheat is more valuable than conventional varieties of wheat, especially since buckwheat has a much higher essential amino acid content and thus has a very high biological value. In addition, buckwheat is gluten-free, so it is also suitable for patients having celiac disease, that is, sprue.

In its natural and shelled or hulled form, buckwheat can be used in a variety of known ways in combination with groats, soups, cutlets, pancakes and tarts, but buckwheat kernels in roasted form are also used for muesli and granola preparations. When roasted, buckwheat develops a nutty taste, and when ground it may be used as an additive to pancakes, waffles and other pastry and baked goods.

The buckwheat kernels used so far, whether in natural form or in preroasted form, also known as kascha, are hard kernels which are a starting material for further processing to foodstuffs, for example, by milling or the like, or prepared foods for which the buckwheat kernels are usually subjected to a swelling process in combination with the addition of water. In this context, there are a number of recipes in which buckwheat kernels are used as an ingredient for preparing food dishes.

JP 55015784 A, for example, has disclosed a process in which shelled and crushed buckwheat kernels are subjected to a roasting process for food preparation.

Austrian Patent AT 163512 describes the preparation of cocoa-like foods by roasting, drying and milling buckwheat and then optionally adding cocoa to the resulting powder.

SUMMARY OF THE INVENTION

The invention is based on the object of making buckwheat accessible for wider and broader use to meet daily food needs because of its positive properties from the standpoint of nutritional physiology, as explained above. In particular with regard to demands for ecological products, it is desirable to create a product based on buckwheat which does not use any preservatives but nevertheless allows the longest possible shelf-life. Furthermore, another aspect to be taken into account is that the product based on buckwheat meets high taste demands and also haptically relevant demands in consumption, that is, the physiologically perception in consuming it should as pleasant and as fresh as possible.

The product of the invention is a mixture, a mixture and/or a preparation, which is based on shelled and roasted buckwheat kernels and receives its individual taste characteristic through suitable use and/or the addition of flavors. Through the production process according to the invention, it is possible to provide buckwheat kernels with a haptic property, which determines the physiological perception when consuming the product, so that the buckwheat kernels are perceived as crunchy and crackly so that in addition to its main area of use, the product may be available as a mixture or a preparation for sauces or for direct consumption as an independent snack.

The process according to the invention for producing such a mixture based on buckwheat includes the process steps described below:

The first step is to provide shelled buckwheat kernels, which do not require any further pretreatment except for the actual shelling operation. The shelled buckwheat kernels are heated in a type of roasting, where the buckwheat kernels are preferably placed in a roasting container, for example, in a type of roasting pan without any further additives and are heated there as rapidly and effectively as possible. The roasting temperatures required for this roasting process should be no higher than 200° C., and it is important to be sure that the shelled buckwheat kernels are subject to constant mixing inside the roasting container in order to prevent degradation phenomena such as burning due to the roasting process. Depending on the amount and the set roasting temperature, this first roasting process may take a few minutes, so that the buckwheat kernels are in a preroasted condition, in which they are capable of imparting a hot to very hot temperature impression when a sample is held in the hand, for example.

The buckwheat kernels which have been preroasted in the manner described above are then roasted further after adding an edible oil, preferably sesame seed oil or canola oil, whereupon the roasting temperature is lowered to prevent burning of the edible oil to be added. The edible oil is added in an amount which ensures complete wetting of the surfaces of all buckwheat kernels. According to the current understanding, the gentle roasting of the oiled buckwheat kernels, which is performed at a slightly reduced roasting temperature, results in the buckwheat kernels absorbing the added edible oil over their surfaces into the interior of the kernels. The roasting process again takes place with constant stirring and mixing of the buckwheat kernels inside the roasting container, and edible oil is added in metered form to the buckwheat kernels until the kernels are no longer capable of absorbing further oil through their respective kernel surfaces. If the buckwheat kernels have reached a golden-yellow coloration during the roasting process, that is, a condition which is established after approximately ten minutes of roasting time, depending on the quantity of buckwheat kernels to be processed, as mentioned above, then in another processing step, the roasting temperature is again increased to max. 200° C., whereupon a solution containing liquid, salt and/or sugar is added to the buckwheat kernels while mixing is continued without interruption. It is also conceivable to add at least one solution containing a flavoring is added to the solution containing liquid.

If a salty and flavored mixture is to be prepared, for example, then ume vinegar is preferably used as the salt-containing solution, preferably applied in the form of a spray to the oiled and roasted buckwheat kernels in the roasting container, as homogeneously and as thoroughly as possible. Urine vinegar is an extract obtained from umeboshi plums and so-called "shiso" leaves. This vinegar contains all the nutrients of the umeboshi plum and stimulates intestinal activity in particular while supporting digestion. Due to the spray application of ume vinegar, all the oiled and roasted buckwheat kernels present in the roasting container are wetted at the kernel surfaces, and then the liquid component of the ume vinegar evaporates due to the prevailing roasting temperatures and at least the nonvaporizable residual constituents of the ume vinegar remain adhering to the buckwheat kernels. Based on the findings obtained in a great variety of roasting operations that have been conducted, it is currently assumed that the salt-containing constituents of ume vinegar, like the oil in the preceding roasting process, penetrate through the surfaces of the buckwheat kernels and into the interior and thereby impart a salty taste to the buckwheat kernels in this way. The process of spray application of a liquid solution of ume vinegar to buckwheat kernels in a roasting container while mixing continuously is preferably performed several times in succession, that is, as soon as the liquid phase of the ume vinegar has evaporated, the buckwheat kernels are again treated with ume vinegar spray. In roasting experiments, it has been found that repeating the spray treatment of the roasted buckwheat kernels with ume vinegar three to five times is sufficient to achieve an acceptable salty taste of the buckwheat kernels.

Like exclusive addition of ume vinegar to obtain salty buckwheat kernels, it is also possible to produce sweet buckwheat kernels through further addition of liquid solutions containing sugar, for example, rice syrup, spelt syrup, maple syrup, whole cane sugar or similar natural sugar products, which may preferably be added for further dilution in suitable liquids.

In particular, in the case when using a liquid solution containing sugar, the surfaces of the individual buckwheat kernels are coated by a layer of sugar by a type of caramelization of the added sugar starting at the prevailing roasting temperature, so that the buckwheat kernels stick together to form clusters. The amount of sugar to be added is preferably such that the sugar layer adhering to the surfaces of the buckwheat kernels is relatively thin, preferably in the range between a few tens of micrometers to a few hundred micrometers, so that the buckwheat kernels coming in contact in the clusters are preferably only in point contact. In this way, buckwheat clusters having a high air content present in the inner spaces are formed.

In a particularly advantageous manner, dried fruit or dried berries such as aronia, sour cherries or cranberries as well as blueberries, ligonberries or barberries may be added to the buckwheat clusters and are likewise integrated into the buckwheat clusters as additional components.

Finally the remaining roasting process is continued until all the liquid components of the respective solution have evaporated and the buckwheat kernels treated in the manner described above can be sent for the final packaging. Depending on the desired taste impression to be imposed, the salty buckwheat kernels may be combined with other additives such as nori seaweed, components of the aloe vera plant or paprika, for example. In this form, the buckwheat kernels may be sent for packaging in final packages with an airtight seal. Other variations on additives instead of or in combination with the examples mentioned above are of course also possible. For example, the addition of components of fruits, vegetables other varieties of produce is suggested.

Due to the roasting treatment of the buckwheat kernels described above, it has been possible on the one hand to impart preferably a salty or a sweet taste impression to the buckwheat kernels (but bitter or acidic taste impressions are also conceivable, depending on the choice of the flavoring solution selected) without having any negative effect on the natural form of the buckwheat kernels, while also creating a refinement of the individual buckwheat kernel that has long-term stability, so the kernels impart a crisp and crunchy impression when consumed. This property also opens up the possibility of direct consumption of buckwheat kernels produced in this manner, for example, in the form of snacks. The buckwheat kernels even retain their crispness for a long time when the mixture described above is added to salad dressings, sauces or dips based on yogurt, sweet cream or sour cream or similar milk products, for example. They retain this property for a long time before undergoing the softening process due to liquid medium.

Again in the case of the sweet taste imparted to the mixture defined above, additional flavors, for example, cinnamon, cloves, ginger, bourbon vanilla or the like are also available and may be added to the buckwheat kernels. The sweet variant of the mixture in particular allows the use of this mixture in baked goods, cookies and other confectionery products, but also for addition to cereals, granola bars and the like. Especially interesting products are obtained by processing buckwheat kernels coated with a layer of sugar, which then form clusters to which additive ingredients, preferably in the form of dried berries, are added. Such products may be offered as granola bars or snacks, depending on the shape and size of the clusters, and may be consumed directly without adding any other ingredients or any further preparation.

The invention claimed is:

1. A process for producing shelled buckwheat kernels for human consumption without further processing, comprising:
   providing the shelled buckwheat kernels without additives and heating the shelled buckwheat kernels to obtain preroasted buckwheat kernels;
   adding an amount of edible oil to the preroasted shelled buckwheat kernels to oil the shelled buckwheat kernels by wetting outer surfaces of the shelled buckwheat kernels while continuing the roasting until the shelled buckwheat kernels are no longer capable of absorbing further edible oil through the outer surfaces and the shelled buckwheat kernels develop a golden-yellow coloration due to absorption of the edible oil into the shelled buckwheat kernels;
   spraying a liquid solution containing salt, or sugar or at least one flavoring on the oiled and roasted shelled buckwheat kernels so that the oiled and roasted shelled buckwheat kernels are wetted by the spraying the solution on the outer surfaces; and
   continuing the roasting until the liquid is evaporated from the shelled roasted buckwheat kernels and the salt, or the sugar or the at least one flavoring remain wherein the shelled buckwheat kernels are ready for human consumption.

2. The process according to claim 1, wherein the roasting of the shelled buckwheat kernels takes place in a roasting pan, without adding additives, until the shelled buckwheat kernels undergo heating without showing any visible signs of degradation.

3. The process according to claim 2, wherein the roasting is carried out at roasting temperatures of a maximum of 200° C.

4. The process according to claim 3, wherein before and/or during the adding of the edible oil to the shelled preroasted buckwheat kernels, the roasting temperature is lowered to a temperature that does not damage the edible oil, and the edible oil does not show any sign of burning.

5. The process according to claim 2, wherein before and/or during the adding of the edible oil to the shelled preroasted buckwheat kernels, the roasting temperature is lowered to a temperature that does not damage the edible oil, and the edible oil does not show any sign of burning.

6. The process according to claim 1, wherein before and/or during the adding of the edible oil to the shelled preroasted buckwheat kernels, the roasting temperature is lowered to a temperature, that does not damage the edible oil and the edible oil does not show any sign of burning.

7. The process according to claim 1, wherein sesame oil or canola is used as the edible oil.

8. The process according to claim 1, wherein the solution containing the salt, or the sugar or the at least one flavoring is added to the oiled shelled buckwheat kernels at a roasting temperature of a maximum 200° C.

9. The process according to claim 1, wherein the spraying is repeated; and another spraying is performed as soon as the liquid deposited on the surface of the shelled buckwheat kernels by the repeated spraying has evaporated.

10. The process according to claim 1, wherein the roasting is continued at a reduced roasting temperature until the mixture is obtained and the roasted shelled buckwheat kernels containing the salt, or the sugar or the at least one flavoring are substantially free of degradation due to roasting at the reduced temperature and the liquid has evaporated.

11. The process according to claim 1, wherein the shelled buckwheat kernels are subjected to mixing during the roasting, including the adding of the edible oil and the spraying of the solution containing the salt, or the sugar or the at least one flavoring.

12. The process according to claim 1, wherein ume vinegar is the solution containing the salt.

13. The process according to claim 1, wherein rice syrup or spelt syrup or a solution containing rice syrup or spelt syrup is the solution containing the sugar.

14. The process according to claim 1, wherein the solution containing the sugar is selected so that the shelled buckwheat kernels are coated by a layer of sugar at the surfaces which is caramelized due to the roasting temperature so that clusters are formed with each cluster having the shelled buckwheat kernels adhering to one another via the caramelized sugar.

15. The process according to claim 1, wherein roasted shelled buckwheat kernels containing the salt, or the sugar or the flavoring are placed in a closable container for cooling after an end of roasting.

16. The process according to claim 1, wherein nori seaweed and aloe vera or paprika or berries are added to the roasted shelled buckwheat kernels containing the salt, or the sugar or the at least one flavoring during and/or at an end of the roasting.

17. The process according to claim 16, wherein the berries comprise aronia berries, sour cherries, cranberries, blueberries, ligonberries or barberries.

18. A process for producing shelled buckwheat kernels for human consumption without further processing, comprising:
   providing the shelled buckwheat kernels without additives and heating the shelled buckwheat kernels to obtain preroasted buckwheat kernels;
   adding an amount of edible oil to the preroasted shelled buckwheat kernels to oil the shelled buckwheat kernels by wetting outer surfaces of the shelled buckwheat kernels while continuing the roasting until the shelled buckwheat kernels are no longer capable of absorbing further edible oil through the shelled outer surfaces and the buckwheat kernels develop a golden-yellow coloration due to absorption of the edible oil into the shelled buckwheat kernels;
   spraying a liquid solution containing salt, or sugar or at least one flavoring on the oiled and roasted buckwheat kernels so that the oiled and roasted shelled buckwheat kernels are wetted by the spraying the solution on the outer surfaces;
   continuing the roasting until the liquid is evaporated from the shelled roasted buckwheat kernels and the salt, or the sugar or the at least one flavoring remain wherein the shelled buckwheat kernels are ready for human consumption; and
   adding the mixture as an additive to dips, or sauces, or soups, or salads.

19. A process for producing shelled buckwheat kernels for human consumption without further processing, comprising:
   providing the shelled buckwheat kernels without additives and heating the shelled buckwheat kernels to obtain preroasted buckwheat kernels;
   adding an amount of edible oil to the preroasted shelled buckwheat kernels to oil the shelled buckwheat kernels by wetting outer surfaces of the shelled buckwheat kernels while continuing the roasting until the shelled buckwheat kernels are no longer capable of absorbing further edible oil through the outer surfaces and the shelled buckwheat kernels develop a golden-yellow coloration due to absorption of the edible oil into the shelled buckwheat kernels;
   spraying a liquid solution containing salt, or sugar or at least one flavoring on the oiled and roasted buckwheat kernels so that the oiled and roasted shelled buckwheat kernels are wetted by the spraying the solution on the outer surfaces with the solution containing the salt, or the sugar or the at least one flavoring;
   continuing the roasting until the liquid is evaporated from the shelled roasted buckwheat kernels and the salt, or the sugar or the at least one flavoring remain wherein the shelled buckwheat kernels are ready for human consumption; and
   adding the mixture as an additive to baked goods, desserts, mixed beverages, cereals or cereal mixtures including dried fruit and/or nuts.

\* \* \* \* \*